United States Patent [19]

Schoenig, Jr. et al.

[11] Patent Number: 4,549,662
[45] Date of Patent: Oct. 29, 1985

[54] TRANSPORT APPARATUS

[75] Inventors: Frederick C. Schoenig, Jr.; J. David Landry; Edward S. Walker, all of Wilmington, N.C.; Ching C. Lai, Pleasanton, Calif.

[73] Assignee: General Electric Company, San Jose, Calif.

[21] Appl. No.: 361,993

[22] Filed: Mar. 25, 1982

[51] Int. Cl.⁴ .............................................. B07C 5/02
[52] U.S. Cl. .................................. 209/539; 198/425; 198/740; 209/654; 209/916; 209/918
[58] Field of Search .............. 209/538, 539, 552, 576, 209/654, 701, 916, 587, 903, 922, 651, 914, 917, 923, 925, 933, 934, 936, 918; 198/461, 425, 738, 739, 721, 372, 410, 411, 740

[56] References Cited

U.S. PATENT DOCUMENTS

| | | | |
|---|---|---|---|
| 2,843,253 | 7/1958 | Peterson et al. | 198/411 |
| 3,355,014 | 11/1967 | Howles | 209/701 |
| 3,710,922 | 1/1973 | Lanphere et al. | 198/398 |
| 3,938,650 | 2/1976 | Holt | 198/425 |
| 4,062,438 | 12/1977 | Cottrell | 198/425 |
| 4,155,455 | 5/1979 | Spierer et al. | 209/701 |
| 4,243,078 | 1/1981 | Sahlin | 141/1 |
| 4,253,768 | 3/1981 | Yaroshuk et al. | 356/431 |
| 4,304,324 | 12/1981 | Huggins | 198/425 |
| 4,349,112 | 9/1982 | Wilks et al. | 209/587 |
| 4,350,251 | 9/1982 | Merck | 209/654 |

FOREIGN PATENT DOCUMENTS 2434099 2/1975 Fed. Rep. of Germany .
2458095 7/1975 Fed. Rep. of Germany .

OTHER PUBLICATIONS

John G. Kay, Automation, "Escapements For Automatic Parts Handling", Mar. 1966, pp. 83–88.

Primary Examiner—Robert B. Reeves
Assistant Examiner—Donald Hajec
Attorney, Agent, or Firm—Ivor J. James, Jr.; Samuel E. Turner; Raymond G. Simkins

[57] ABSTRACT

Transport apparatus is disclosed for moving a stream of objects along a substantially continuous path between a source and a collection station and past a viewing station. A stream of successive, spatially separated objects is moved into end-to-end abutment to form successive stacks of objects. Each stack is spiraled past the viewing station with minimal vibration to expose the complete surface of each object to inspection. Subsequently each stack is rearranged into spatially separated objects which are rapidly sorted by diverting those objects from the continuous path which do not conform to predetermined criteria upon inspection. The transport apparatus achieves high throughput without compromising the accuracy of the inspection process.

11 Claims, 13 Drawing Figures

TRANSPORT APPARATUS

The present invention relates in general to new and improved apparatus for transporting objects and more particularly to apparatus for transporting a stream of substantially cylindrical pellets along a substantially continuous path between a pellet source, past a viewing station and to a loading station along a substantially continuous path.

CROSS REFERENCE TO RELATED APPLICATIONS

The following applications are respectively incorporated by reference herein:

"Optical Inspection System", J. David Landry, Truman F. Kellie and Ching C. Lai, Ser. No. 361,992, filed Mar. 25, 1982;

"Tray Loader Method and Apparatus for Nuclear Fuel Pellets", Harold Bleckley King, Ching Chung Lai and Edward Samuel Walker, Ser. No. 362,046, Filed Mar. 25, 1982; and "Automated Inspection System", Frederick C. Schoenig, Jr., Leonard N. Grossman, Ching C. Lai, William Masaitis, Robert O. Canada, Ser. No. 361,933, filed Mar. 25, 1982.

BACKGROUND OF THE INVENTION

The fuel rods in use in nuclear reactors commonly use cylindrical pellets composed of uranium dioxide bound in a matrix material. Following grinding the pellets to their final shape and before they are stacked in the fuel rods, the pellets must be inspected for flaws and other anomalies, for conformance to predetermined length measurement and conformance to a cylindrical shape.

In use, the pellets are packed tightly in metallic tubes in the nuclear reactor. The metallic tubes dissipate heat generated by the pellets into a surrounding medium. Thus, a good heat-exchange relationship must exist at the pellet-metallic tubing interface and this is provided when the pellets' surfaces conform to the cylindrical shape of the tubing. Inspection for conformance to this and other criteria is conventionally carried out by automated optical equipment which examines pellets and sorts them according to their degree of conformance.

One approach used in prior art apparatus for optically inspecting such pellets employs mechanical hands to carry individual pellets from a stream of pellets to an inspection station. At the inspection station each pellet is rotated in order to completely expose it to view and other mechanical hands transport it back to the pellet stream where sorting is carried out to deliver the pellets to selected locations.

The prior art apparatus described requires complicated mechanical linkages to operate the hands, and the speed of inspection is limited by the speed with which the hands can move the pellet out of and back into the pellet stream, respectively. Further, since the pellets are composed of a highly abrasive material, the roller supports on which the pellets are rotated are rapidly abraded away, and the useful lifetime of each is limited. Often the rollers are abraded unevenly the develop surface ridges. These ridges can cause the pellets to jitter or chatter during rotation, thereby rendering the inspection equipment incapable of obtaining a clear pellet image and hence incapable of an accurate measurement. Such apparatus is also prone to problems of pellet identification. It has been found difficult to correlate information concerning the actual physical location of a particular pellet with the measured information concerning the same pellet obtained by the inspection equipment. Such a situation produces difficulties in coordinating the mechanical hands with the rest of the transport, thus causing further delays in pellet viewing and sorting.

Another approach used by the prior art for optically inspecting pellets employs a camera which moves along a track located above rollers that support a rotating string of pellets. Such apparatus also causes the rollers to wear unevenly, thus causing eventual unacceptably large vibrations and jitter of the rotating pellets.

Both types of equipment discussed above are prone to introduce dust into the air and to create a dust-laden atmosphere within which both types of inspection devices are required to function. The dust particles lodged in the mechanical linkages of either the moving camera or the mechanical hands are apt to cause vibrations and other objectional phenomena.

OBJECTS OF THE INVENTION

It is a primary object of the present invention to provide new and improved article transport apparatus which avoids the problems inherent in prior art equipment.

It is another object of the present invention to provide new and improved transport apparatus capable of moving a stream of pellets in a linear direction past a viewing station.

It is a further object of the present invention to provide new and improved transport apparatus which is capable of moving a stream of pellets past a viewing station with minimal vibration of the pellets.

It is still another object of the present invention to provide new and improved transport apparatus which utilizes pellet-supporting rollers whose surfaces are maintained smooth by the abrasion caused by pellet motion across them.

It is still a further object of the present invention to provide new and improved pellet transport apparatus which is capable of rapidly sorting a continual stream of pellets by diverting them to a plurality of locations.

It is yet another object of the present invention to provide new and improved transport apparatus which is more readily adapted to operate trouble-free in a dust-laden atmosphere.

It is yet a further object of the present invention to provide new and improved pellet transport apparatus which facilitates reliable identification and location of the traveling pellets.

These and other objects of the invention together with the features and advantages thereof will become apparent from the following detailed specification when read in conjunction with the accompanying drawings.

SUMMARY OF THE INVENTION

In accordance with the foregoing objects, the invention comprises transport apparatus for moving a succession of substantially cylindrical pellets along a substantially continuous path. Initially the pellets are moved in mutually spaced relationship from the pellet source to a stacking means where they are formed into successive stacks each containing a predetermined number of pellets. While successive stacks are spaced from each other, within each stack the pellets are in end-to-end abutment.

A portion of the overall path contains a pair of elongated rollers capable of supporting a pellet stack thereon. Means are provided for rotating the rollers at a controlled angular velocity which is imparted to the pellet stack supported thereon. Pusher means are provided for moving each stack at a controlled linear velocity along the length of the roller and past an inspection station. The combined rotational and linear motion causes the pellet stack to spiral around its own axis along the rollers so as to expose all portions of the surface of each pellet to the inspection station. The end-to-end abutment of the pellets in each stack stabilizes the spiralling pellets and thus minimizes vibration and jitter during inspection. Further, the linear motion of the pellets relative to the rollers serves to provide a constant honing action which maintains the roller surfaces in a smooth condition and avoids the formation of ridges on these surfaces.

Following inspection, the pellets of each stack are again spatially separated and they are transported in this manner to sorting means which divert selected pellets from the path, depending on the results of the inspection. The acceptable pellets continue to travel along the path until they are received at a collection station. In a preferred embodiment of the invention, the path between the pellet source and the collection station is substantially linear and a high throughput is achieved without denigrating the accuracy of the inspection process.

DETAILED DESCRIPTION OF THE INVENTION

Figure 1:
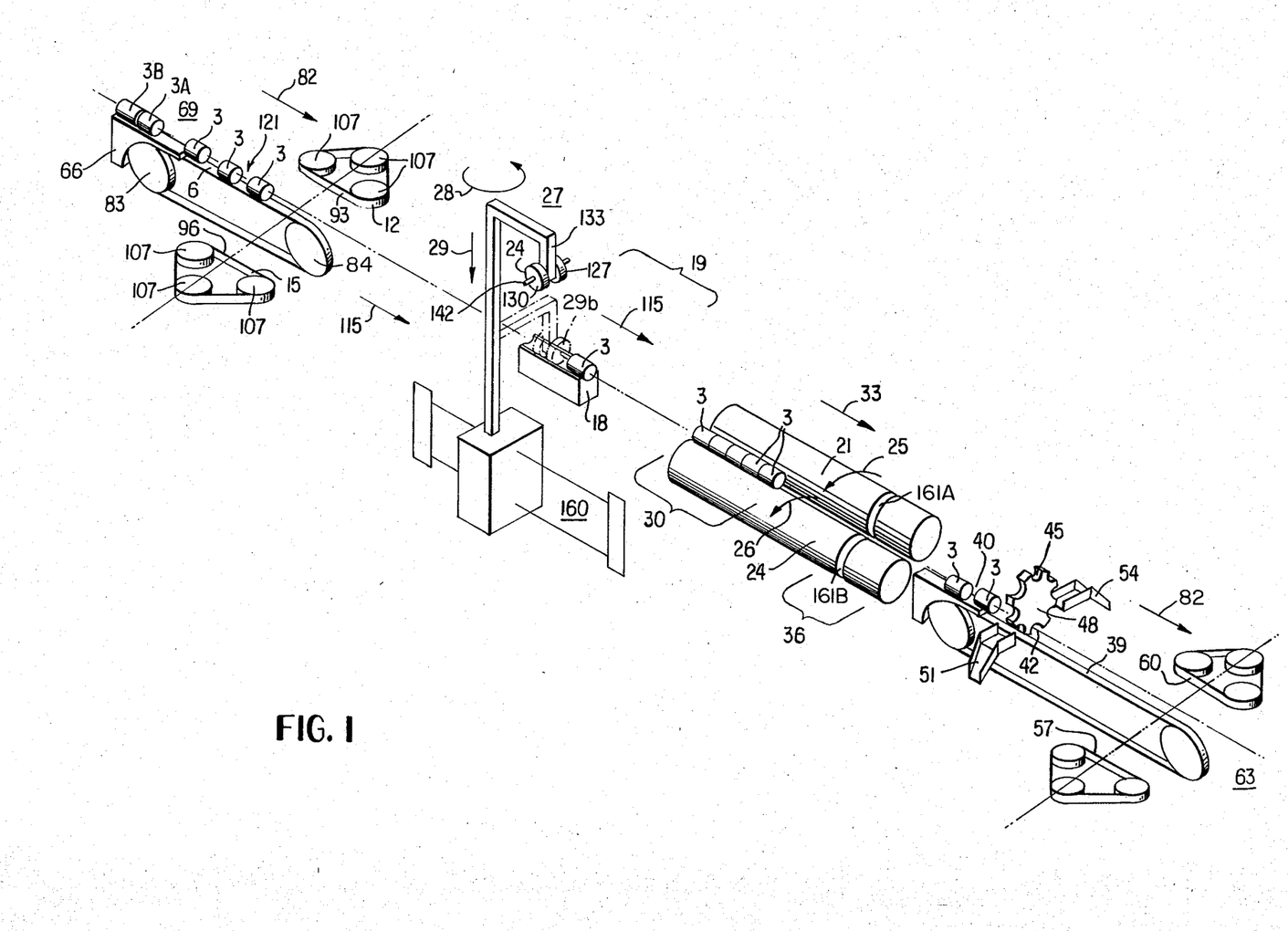
FIG. 1 depicts an exploded perspective view of a preferred embodiment of the present invention.

To facilitate the subsequent explanation, a generalized description will first be given of the events that occur in accordance with the present invention during the travel of stream of substantially cylindrical pellets along a substantially continuous path. FIG. 1 depicts in an exploded view a preferred embodiment of the invention in which cylindrical pellets 3 are supplied from source (not shown) to a first transport means such as a belt 6. The belt transports the pellets to stacking apparatus comprising two belts 12 and 15 having gripping surfaces 93 and 96 respectively positioned in a vertical plane. Such belts are herein termed "vertical belts."

Figure 5:
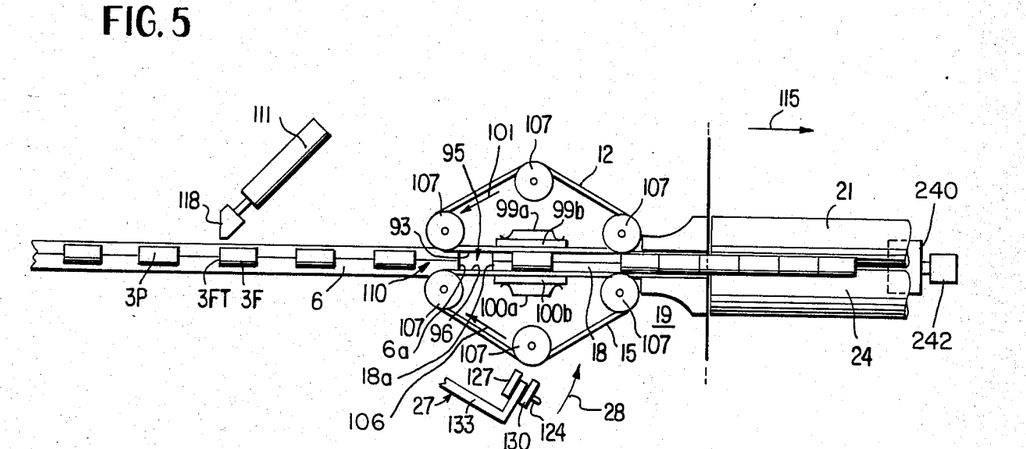
FIGS. 5, 6 and 7 represent a top schematic view of a portion of the apparatus shown in FIG. 1.
Figure 6:
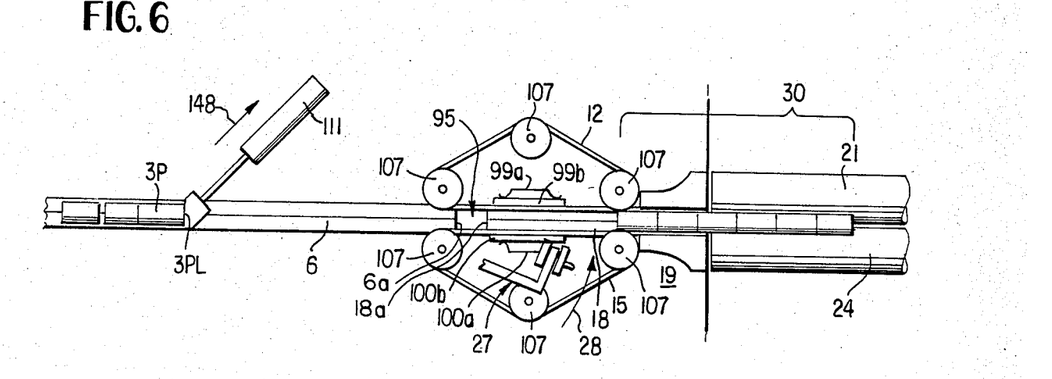
Figure 7:
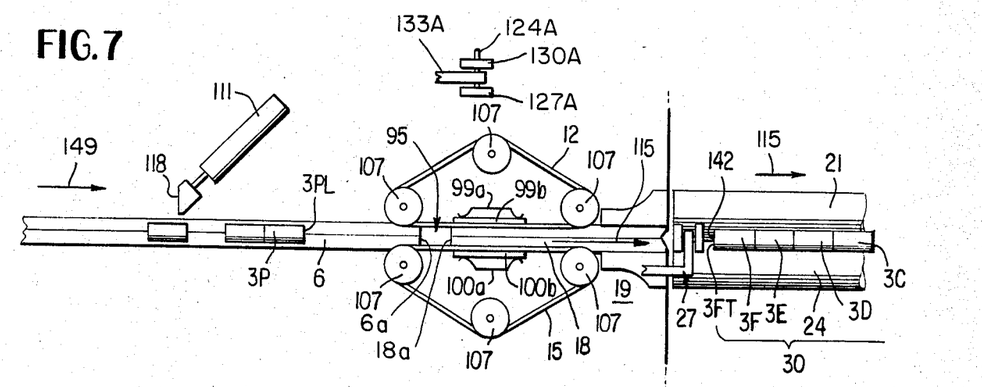

Both vertical belts 12 and 15 travel at the same speed as belt 6 and grasp opposite sides of each pellet 3 and push each pellet 3 to a stationary support 18 located at a section along the track designated generally by the reference numeral 19. It should be noted that FIG. 1 is an exploded schematic view which shows vertical belts 12 and 15 extending only slightly beyond belt 6. This is done to prevent obstruction of details in the vicinity of stationary support 18. However, as FIGS. 5, 6 and 7 show, and as is explained below, vertical belts 12 and 15 do extend beyond belt 6 and alongside stationary support 18. As each succeeding pellet is transported to stationary support 18 by vertical belts 12 and 15 it contacts the pellet which preceded it to support 18 and pushes it and all of the other earlier arrived pellets in the direction of arrow 115. Thus, each succeeding pellet 3 is added to a group of earlier-arrived pellets to form a stack 30. The pellets are pushed along the track toward a pair of rollers 21 and 24 which are mutually parallel and spaced apart to define a channel extending along the track. The rollers rotate in the same direction.

When a sufficient number of pellets has arrived at location 19 to fully occupy stationary support 19, the arrival of succeeding pellets pushes the pellets onto rollers 21 and 24 in the order in which they arrived. The rollers impart a controlled rotational velocity to the pellets that are positioned in the aforesaid channel. At a selected point in time, a pusher control arm 27 rotates in the direction of arrow 28 and drops in the direction of arrow 29 so that arm 27 occupies the position indicated in ghost outline at 29b. Pusher control arm 27 then pushes stack 30 in the direction indicated by arrow 115, across the viewing station located at 36, and then off rollers 21 and 24 and onto a second transport means such as belt 39.

Belt 39 is moving at a linear velocity greater than that at which pellet stack 30 is pushed by control arm 27, so that belt 39 carries each arrived pellet a short distance before the next pellet alights on the belt 39. Thus, a space 40 is created between successive pellets to provide a moving train or succession of mutually spaced pellets 3.

Belt 39 carries each pellet through a passage such as 42, which is formed by one of a number of bays 45 in a sorter wheel 48. If a pellet is present in passage 42, rotation of sorter wheel 48 will knock it off belt 39 into one of chutes 51 or 54, depending upon the direction of rotation of the sorter wheel. If the sorter wheel is stationary, the pellet is carried further by belt 39 to an unloading means, such as that comprising vertical belts 57 and 60. Belts 57 and 60 grasp opposite sides of each pellet and transport it to a container located at 63.

Thus each pellet 3 moves along a track in a linear direction illustrated by arrows 82, 115 and 33 and including first and second transport means comprising belts 6 and 39 respectively at opposite ends of the rollers. Moreover, the linear track is spatially continuous and thus requires no discontinuities in pellet travel. The pellets travel separated from each other until they reach the stacking means which arranges them into a stack. Pusher 27 then pushes the stack along the track and along the rollers which rotate the stack. After pusher arm 27 pushes the stack past a viewing station, the pellets are separated to resume travel in a spaced-apart stream.

The foregoing generalized description of the invention will serve as background for the detailed discussion of the invention below.

Figure 2:
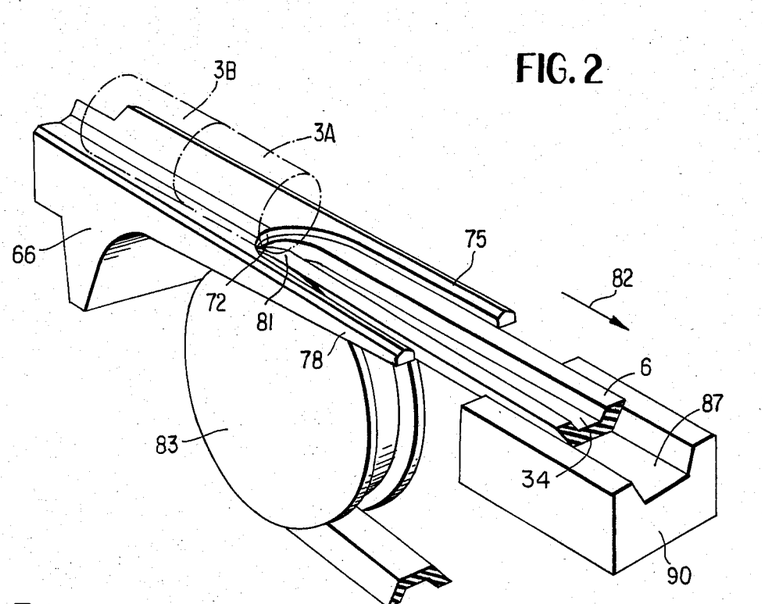
FIG. 2 depicts a perspective view of an input chute used in the apparatus of FIG. 1.

Pellets are supplied from a source (not shown) to an input chute 66 which is best illustrated in FIG. 2 and and which is located near a position designated by the numeral 69 in FIG. 1. Each pellet, such as 3A shown in ghost outline in FIG. 2, is pushed along a chute 66 by a subsequent pellet 3B, until it reaches branching point 72. At 72, chute 66 divides into two supporting branches 75 and 78, which straddle belt 6. At approximately this time, pellet 3A will have been pushed far enough by subsequent pellets, such as 3B, that its bottom surface 81 is drawn by friction onto belt 6. Branches 75 and 78 serve to guide pellets onto belt 6. Further, if a pellet is standing on end on chute 66, as the pellet is pushed onto moving belt 6 it will tend to topple over. Branches 75 and 78 further serve to guide such toppling pellets onto belt 6 to prevent them from toppling to the ground. This belt is moving in the direction shown by arrow 82 and is supported by a pair of sheaves 83 and 84, as shown in FIGS. 1 and 2. Pellet 3A will travel a short distance before the subsequent pellet 3B is drawn onto belt 6 in similar manner. The process continues and a train of spaced pellets, supported and transported by belt 6, is created.

Figure 3:
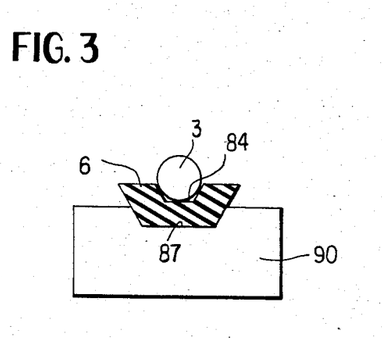
FIG. 3 is a cross-sectional view of the endless belt of FIG. 2 together with a support therefor.

As shown in FIG. 2, belt 6 contains a groove 34 which assists in maintaining pellets 3 at positions near the center of belt 6. Further, as shown by FIGS. 2 and 3, belt 6 itself is supported by, and slides along, a groove 87 in a metallic support bar 90. The surface of groove 87 is composed preferably of an abrasion-resistant metal, such as chromium or a related alloy. Support bar 90 functions to damp vibrations which would otherwise tend to occur in the tautly stretched belt and which would be transmitted to pellet 3.

Belt 6 transports the succession of spaced pellets to loading means comprising vertical belts 12 and 15 in FIG. 1. Belts 12 and 15 comprise a pair of mutually parallel vertical gripping surfaces respectively designated 93 and 96. This is further shown in perspective view in FIG. 4 and as schematic top views in FIGS. 5, 6 and 7. As these Figures show, belt 6 ends at point 6A while stationary suport 18 begins at point 18A, leaving a gap indicated at 95. Pellets of a correct diameter are carried over this gap by vertical belts 12 and 15. However, under-sized pellets are not gripped tightly enough by vertical belts 12 and 15 to be so carried and such pellets consequently fall through the gap and are removed from the track. The gripping surface of belt 12 is urged toward that of belt 15 by a spring 99a which pushes against a flat bearing 99b. The gripping surface of belt 15 is similarly urged toward that of belt 12 by a similar spring 100a which pushes against a similar flat bearing 100b, illustrated in FIGS. 5, 6 and 7. Belts 12 and 15 move in the direction of arrows 101 and 104 respectively. Belts 12 and 15 are supported and driven by suitable supports such as sheaves 107.

When pellet 3 reaches position 110, gripping surfaces 93 and 96 squeeze opposite sides of the pellet due to the action of the springs 99a and 100a. Control of the motion of pellet 3 along the track is accordingly assumed by belts 12 and 15. Each pellet is brought to position 19, best shown in FIGS. 1 and 4, at which it is ejected by belts 12 and 15 onto stationary support 18. Each pellet positioned on the stationary support resides there until belts 12 and 15 push a subsequent pellet into contact with it, pushing it forward in the direction of arrow 115 along the track. When an earlier-arrived pellet on the stationary support is pushed far enough along the track by a sufficient number of subsequent pellets, it moves onto the pair of rotating rollers 21 and 24. The surfaces of rollers 21 and 24 are preferably composed of hard material such as Carboloy ® in order to resist abrasion by the sliding pellets. As indicated by arrows 25 and 26 in FIG. 1, both rollers rotate in the same direction. Means for rotating the rollers are well known in the art and may, for example, comprise a friction wheel 240 in contact with both rollers and driven by a motor 242, as shown in FIG. 5. Alternatively, motor 242 may be gear-coupled to the rollers, or another equivalent device may be used. The rotational motion of the rollers is imparted to the pellet and it begins to rotate at the controlled rotational velocity of the rollers.

A delay device 111 is shown in FIGS. 5, 6 and 7 and be operated by a pneumatic piston or by an electric solenoid located at point 121 in FIG. 1. At a selected point in time, the solenoid is activated and injects a blocking surface 118 into the track to stop the forward pellet motion. The blocking surface delays pellets, such as 3P and those following, for a brief time interval to allow the last pellet which passed point 121 to reach position 19 on stationary support 18. When this last pellet reaches position 19, a portion of the track as shown in FIG. 6 will be free of the presence of any pellets. At this time, pusher control arm 27, which is schematically illustrated by the assembly comprising tapered thrust pin 124, wheels 127 and 130, and support arm 133 in FIGS. 1, 5, 6 and 7, is rotated in the direction of arrow 28 and is lowered in the direction of arrow 29, in FIG. 1, to the surface of stationary support 18. Arm 27 moves in the direction of arrow 115 in FIG. 7. A tangent point 142 of thrust pin 124 contacts the trailing surface 3FT of trailing pellet 3F in stack 30 and pushes the entire stack 30 along rollers 21 and 24.

Figure 8:
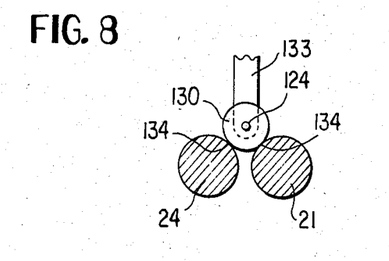
FIG. 8 illustrates in cross-sectional view a portion of a pusher in relationship to the rollers.
Figure 9:
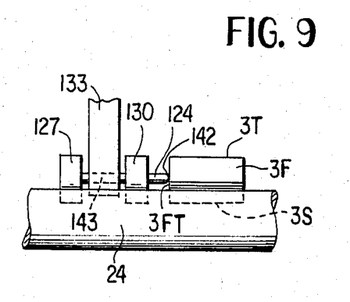
FIG. 9 is a side view of the portion of the apparatus shown in FIG. 8.

The above-described thrust pin 124, wheels 127 and 130, support arm 133, and rollers 21 and 24 are further depicted in FIGS. 8 and 9. These Figures illustrate the spaced relationship of rollers 21 and 24 and the points of contact 134 of wheels 127 and 130 with rollers 21 and 24. Wheels 127 and 130 are rotatably supported on axle 143. Thrust pin 124 is tapered to provide a tangent point 142 for contact with the trailing face 3FT at an area which is of minimal size. The purpose is to minimize the drag and accompanying vibration which thrust pin 124 transmits to pellet 3F when, for an interval during the movement of stack 30 by the action of arm 27, trailing pellet 3F is rotating while thrust pin 124 is not. This will become clear with reference to FIG. 5, in which pusher arm 27 is schematically shown in its retracted position.

Upon actuation, arm 27 is rotated in the direction of arrow 28 in FIGS. 5 and 6 and it is lowered between the planes of gripping surfaces of vertical belts 12 and 15. At the end of the descent of arm 27, wheels 127 and 130 in FIG. 5 are brought into contact with stationary suport 18, as shown in FIG. 7. As the pusher moves in the direction of arrow 115 in FIGS. 4 and 7, the pellets numbered 3C, then 3D, and 3E are set into rotation one after another by contact with rollers 21 and 24. When the trailing pellet, i.e. pellet 3F, is at first set into motion, wheels 127 and 130 are not as yet rotating because they are in contact first with stationary suport 18 and then with rollers 21 and 24 as they move in the direction of arrow 115. However, the area of contact between non-rotating thrust pin 124 and trailing surface 3FT is minimized due to the fact that the area is that of tangent point 142 of thrust pin 124. Thus, any disturbance to rotating trailing pellet 3F by the non-rotating thrust pin 124 is minimal.

Figure 4:
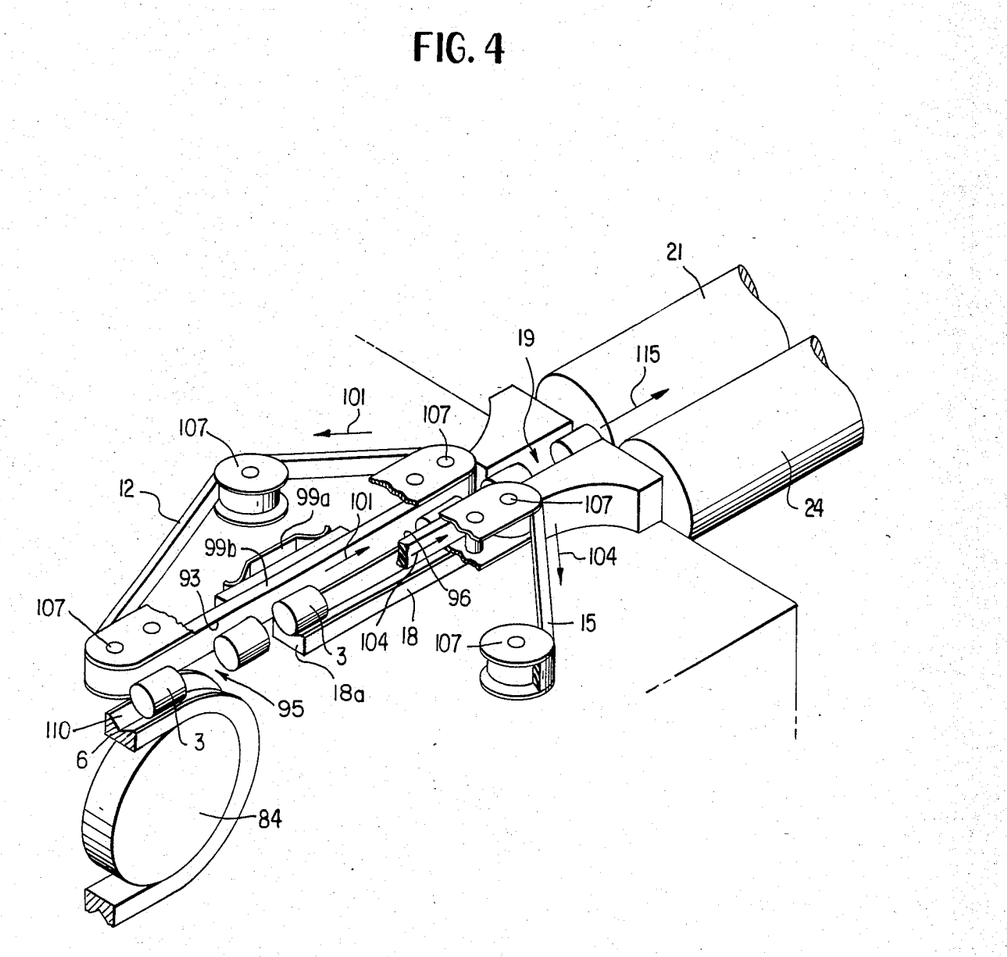
FIG. 4 depicts a pair of endless belts (one being shown broken away for clarity) for advancing the pellets.
Figure 8A:
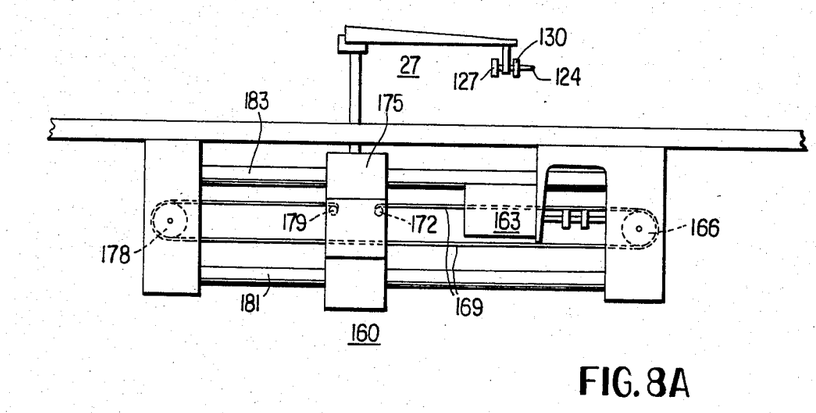
FIG. 8A depicts a side elevational view of a pusher arm gantry, and actuating mechanism.

As pusher arm 27 continues to move in the direction of arrow 115 in FIGS. 4 and 7, first wheel 130 and then wheel 127 alight upon rollers 21 and 24 and are set into rotation. They are caused to rotate with an angular velocity determined by the relative diameters of rollers 21 and 24 and wheels 127 and 130. Preferably, the diameters of wheels 127 and 130 are the same as the pellet diameter. It is possible that a pellet of smaller diameter than its two neighboring pellets will be squeezed between them and will not contact rollers 21 and 24. In such a case the angular velocity of the smaller pellet is determined by that of its neighbors and will be equal to it. Arm 27 moves in the direction of arrow 115, at a velocity controlled by a transport mechanism 160 which is illustrated in FIGS. 1 and 8A. In this transport mechanism, a stepping motor 163 drives a drive sprocket 166 which, in turn, drives a perforated stainless steel tape 169 by engaging teeth (not shown) of sprocket 166 with the perforations of said tape. The tape extends from attachment point 172 on pusher gantry 175, around drive sprocket 166, to idler sprocket 178 and thence to second attachment point 179 on pusher gantry 175. Pusher gantry 175 slides along rails 181 and 183. Arm 27 is rotated in the direction of arrow 28 in FIG. 1 by a mechanism not shown, but located within gantry 175.

A short time after arm 27 begins to push stack 30 along rollers 21 and 25, delay means 111 is deactivated to move blocking surface 118 in the direction of arrow 148 in FIG. 6. This allows the delayed pellets, such as 3P, to continue along the track. Blocking surface 118 is removed with a velocity component, such as that indicated by arrow 149 in FIG. 7, which is sufficiently great so that the blocking surface 118 immediately pulls free of the leading edge 3PL of first delayed pellet 3P. In this manner, any disturbance or vibration of the first delayed pellet is minimized.

Figure 10:
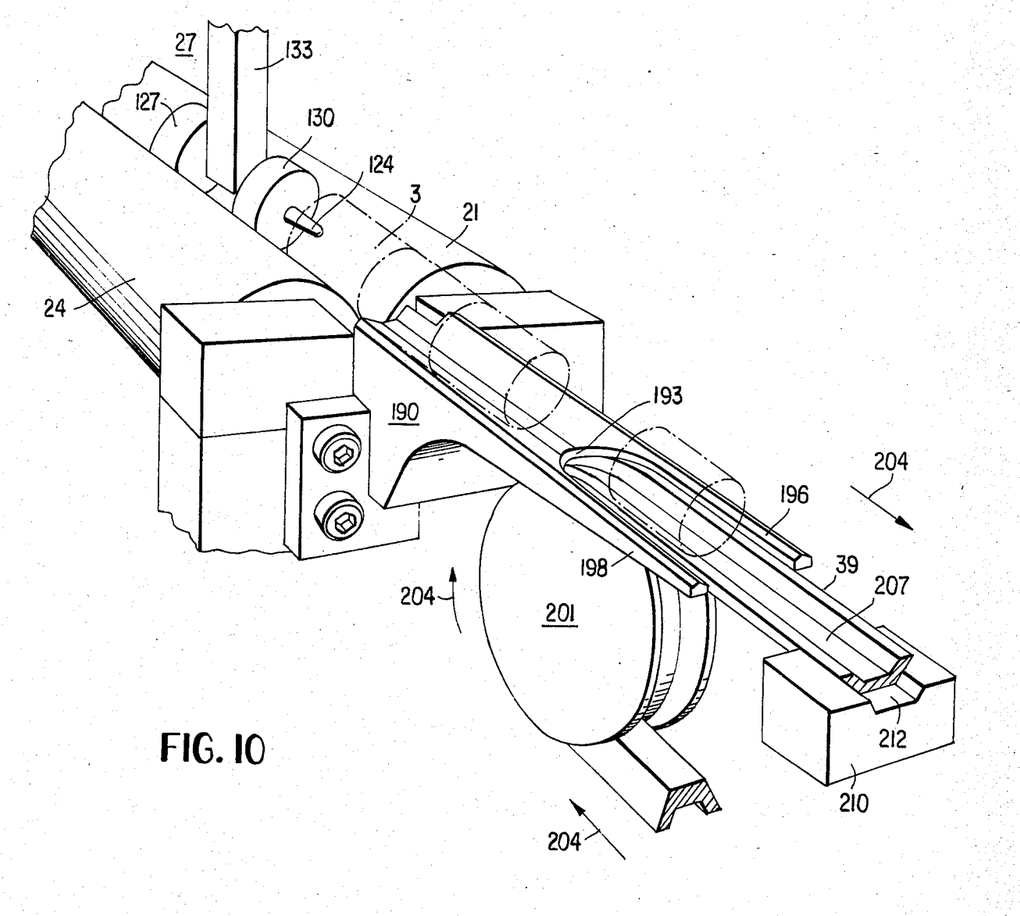
FIG. 10 illustrates a portion of the apparatus of FIG. 1 in the vicinity of the output chute.

During the foregoing operation, pusher control arm 27 pushes the stack of pellets along the track defined by rollers 21 and 24 and through viewing station designated 36 in FIG. 1. Rollers 21 and 24 include circumferential slits 161A and 161B, respectively, located at viewing station 36. These slits allow a light beam directed sideways at a pellet to strike both the top 3T and the bottom 3S of the pellet, both shown in FIG. 9, to allow the pellet's diameter to be measured. Arm 27 continues to push the stack of pellets off rollers 21 and 24, onto unloading chute 190 in FIG. 10 and toward branch point 193. At point 193 chute 190 branches into two supporting branches 196 and 198, which straddle second transport means, such as belt 39. Belt 39 is supported by suitable means such as sheave 201 and moves in the direction shown by arrow 204 at a higher speed than pusher control arm 27. As each pellet reaches branch point 193, it is drawn by friction onto belt 39 and a train of spaced pellets is generated in a manner similar to that described above in connection with loading chute 66.

Figure 11:
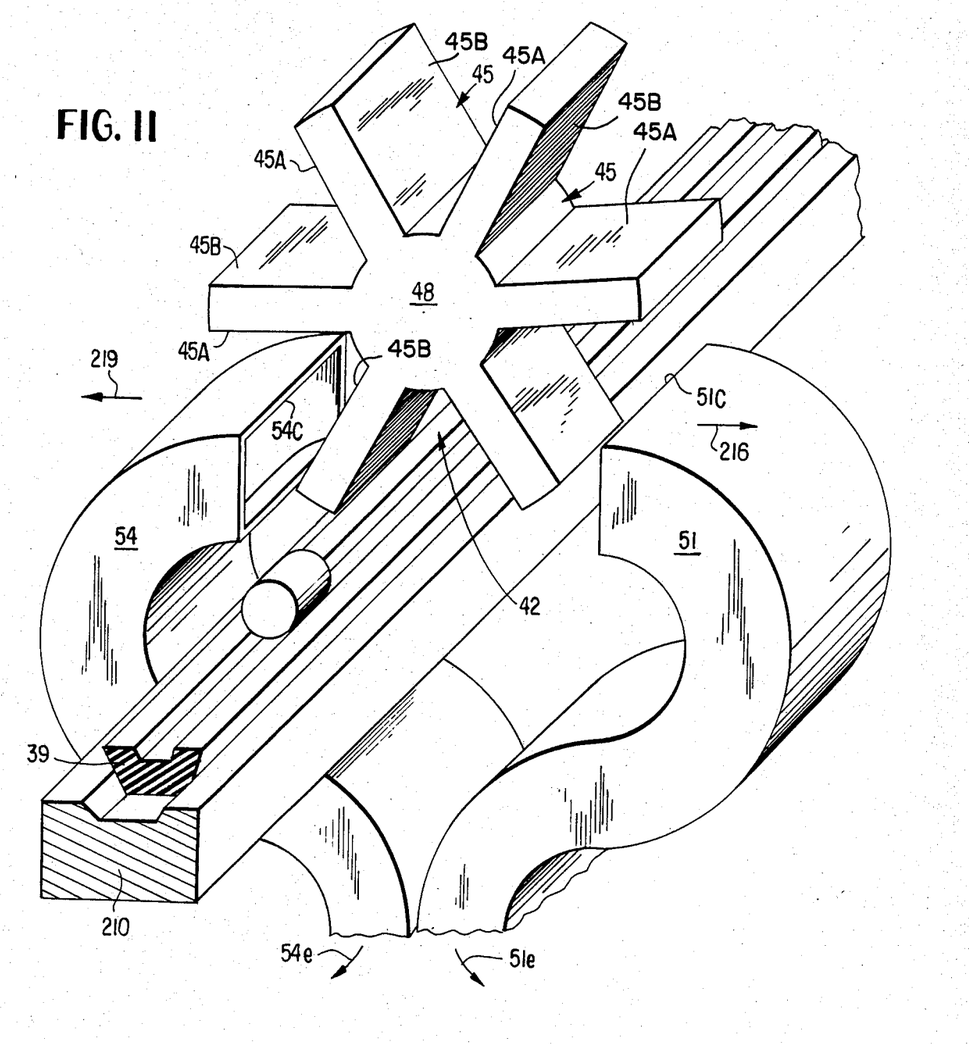
FIG. 11 depicts a preferred configuration of a sorter wheel and cooperating chutes.

Belt 39 includes a groove 207 and is supported by a rigid support 210. The latter includes a longitudinal groove 212, which is similar in structure and function to that depicted at 87 in support 90 shown in FIG. 2. As shown in FIG. 1, belt 39 carries the train of spaced pellets through passage 42 which is, at any given moment, defined by one of bays 45 in rotatable turret sorter wheel 48. FIG. 11 illustrates a preferred configuration of sorter wheel 48, as shown, wheel 48 contains a plurality of bays 45 located at predetermined circumferential postions. Each bay 45 is defined by a pair of side walls, or paddle portions 45A and 45B. When the sorter wheel is positioned as shown in FIG. 11, the pellet train is free to travel through passage 42, which is defined, at any given moment, by the lowest-positioned bay of the sorter wheel. If the sorter wheel is rotated at a time when a pellet is located within passage 42, either paddle portion 45A or 45B will strike the pellet and force it to move in the direction of either arrow 216 or 219 depending on the direction of rotation of the sorter wheel. Such rotation of the sorter wheel removes the pellet in question from the track. In the preferred embodiment of the invention shown in FIG. 11, closed chutes 51 and 54 are used in place of the open troughs illustrated in FIG. 1. A pellet diverted in the direction of arrow 216 will be flung into chute 51 in FIG. 11 and a pellet thrust in the direction of arrow 219 will be flung into chute 54.

Initially, the pellet will slide or roll along the ceiling of the respective chute into which it is flung, namely along ceiling 51c or 54c, in FIG. 11, to be diverted in the direction dictated by such chute as schematically indicated by arrow 51e or 54e. Ceilings 51c and 54c preferably define a curved path to minimize damage to the Where the chutes simply constitute open troughs having straight surfaces. Accordingly, sorter wheel 48 functions to either allow pellets to travel unimpeded along the track, or to divert them to one or the other of troughs 51 and 54.

It is to be noted that sorter wheel 48 performs a sorting or track-switching function with immediate recovery. In other words, it is not necessary to return the sorter wheel 48 to its original position in order to divert another succeeding pellet. This is the case because the diversion of a first pellet from the track, which results from the rotation of the sorter wheel through a predetermined angle, brings a second bay 45 (identical to the first) into position. In effect, when a pellet is diverted, the sorter wheel moves to a new position in which its state of readiness is the same as in the original position.

Pellets which are not diverted by sorter wheel 48 are transported by belt 39 along the track to the unloader means. The latter comprise belts 57 and 60, as shown in FIG. 1. Vertical belts 57 and 60 face each other and serve to grip opposite sides of pellet 3 in similar manner to belts 12 and 15 described above. These belts deliver pellets 3 to a destination 63 for packing by packing apparatus not shown.

Figure 12:
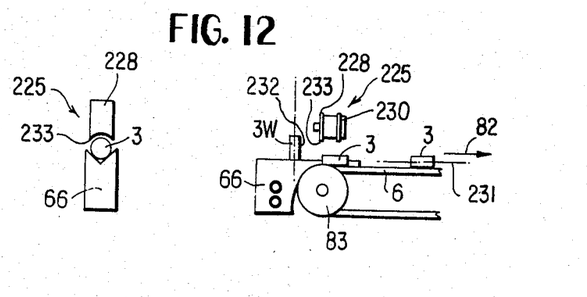
FIG. 12 depicts alignment means used in the apparatus of FIG. 1.

An additional feature of the preferred embodiment of the invention is illustrated in FIG. 12, where alignment means 225 is shown located above loading chute 66 and sheave 83. Alignment means 225 comprises at least one dangling sheet of resilient material 228 and preferably a similar sheet of dangling material such as 230, located further along the track. Sheets 228 and 230 are dimensioned such that pellet 3, moving in the direction of arrow 82 and whose axis is oriented as shown at 231, is properly aligned with the track and will not be disturbed. However, if a pellet is misaligned, as by standing on its end like pellet 3W, a point 232 on the side of the pellet will strike point 233 of resilient sheet 228. This action knocks the forward-moving pellet backward and urges the pellet's axis into alignment with the track as the pellet is carried away by belt 6. Resilient sheet 230 serves a redundant function in the event that sheet 228 should fail to align misaligned pellet 3W.

In accordance with the principles of the present invention, while a stack of pellets in end-to-end abutment is pushed across the viewing field in the manner disclosed, vibration and jitter of the pellets is substantially eliminated. This is due to the fact that the mutually abutting pellets support each other and thus extremely precise camera imaging for the optical measurement of the pellet surface features can be achieved. Further, the highly abrasive nature of the pellets, which in prior art systems detrimentally and unevenly abrades the support rollers, is used to advantage by the present invention. It has been found that such abrasion as does occur produces uniform wear of the rollers due to the uniform motion of the pellets along the rollers in the direction of track.

The transport apparatus disclosed herein is capable of transporting a continuous train of spaced pellets in a linear direction, whereby adjacent pellets are in contact with each other as the pellets move past an inspection station. Ordinarily, sliding motion of nonrotating pellets along the extremely hard roller surfaces would result in vibration and jitter of the pellets. However, if the pellets are rotating, stacking the pellets substantially eliminates this problem. It is theorized that this is a result of increasing the effective mass and angular momentum of the pellet from that of a single pellet to that of the entire stack so that the energy required to induce vibrations is correspondingly increased. Further, the stack's angular momentum vector is parallel the surface of the rollers. Alternately, it is theorized that this results from damping such vibrations as are induced by friction occurring at pellet-to-pellet interfaces.

Further, uneven abrasion of the rollers which support and rotate the pellets at the inspection station is substantially eliminated because the sliding motion of pellets whose surfaces are aligned in parallel with the roller surfaces constantly hones and abrades the rollers to maintain smooth surfaces. The invention further provides for sorting pellets by the rapid diversion of selected pellets out of the pellet stream and into selected chutes. Further, complex mechanical linkages, which are vulnerable when exposed to a dust-laden atmosphere, are eliminated. Finally, the present invention provides an orderly, linear manner of pellet movement, which facilitates identification and tracking and which maximizes pellet throughput without compromising the accuracy of inspection. Although it is contemplated that the sequential operation of the component parts of the operation be computer-controlled in accordance with the sensed pellet positions and that the various operations be coordinated by computer, such control and coordination are beyond the scope of this invention.

The invention disclosed herein utilizes a tapered thrust pin. However, if the trailing surface of the pellet stack is expected to be rough, as due to an engraved marking or due to missing pellet material, a thrust pin having a large, smooth, surface area is preferred. This reduces vibrations caused by the rough surface rotating along the tangent point of the thrust pin.

While a preferred embodiment of the invention has been disclosed, it will be understood that the invention lends itself to numerous modifications, changes, variations, substitutions and equivalents and that certain disclosed features may be used without the use of other such features. All of these changes will be obvious to persons skilled in the art and are embraced within the invention herein. Accordingly, it is intended that the present invention be limited only by the spirit and scope of the appended claims.

What is claimed is:

1. Apparatus for transporting a succession of substantially cylindrical pellets along a substantially linear, continuous path, comprising:
   means for stacking a predetermined number of said pellets in coaxial end-to-end abutment, said stacking means including a pair of belts movably disposed on opposite sides of said path, said belts presenting parallel gripping surfaces to said pellets positioned in a pair of vertical planes;
   first pusher means separate from said stacking means and positioned to move the assembled stack of pellets continuously along a portion of said path following said stacking means, said first pusher means including a rotatable thrust pin adapted to apply a force to the trailing pellet of said stack along the stack axis to push said stack along said path portion at a predetermined linear velocity;
   means for jointly rotating the pellets present in said path portion at a controlled angular velocity about said stack axis while said stack is being moved by said pusher means;
   whereby said stack is caused to spiral continuously at a controlled velocity along said path portion.

2. Apparatus according to claim 1, wherein said rotation means includes a pair of mutually spaced rollers in said path portion adapted to support said pellets therebetween and means for rotating said rollers in the same direction at the same angular velocity; and
   wherein said first pusher means further comprises means for rotatably supporting said thrust pin, and a pair of wheels mounted on said thrust pin and adapted to be rotated by contact with said rollers, said wheels having substantially the same diameter as said pellets so as to rotate said thrust pin at substantially the same angular velocity as said pellets while translating along said rollers.

3. Apparatus according to claim 1, wherein said first pusher means further includes means for lifting said thrust pin above said path after said stack has been pushed beyond said path portion.

4. Apparatus according to claim 3 wherein said first pusher means is disposed on one side of said path, said first pusher means further including means for moving the lifted thrust pin into and out of vertical alignment with said stack axis; and
   said apparatus further compising second pusher means substantially indentical to said first pusher means and disposed on the opposite side of said path, said second pusher means being adapted to alternate with said first pusher means to push successive stacks along said path portion.

5. Apparatus according to claims 1, 2 or 4, and further comprising first transport means for moving said pellets in mutually spaced relationship to said stacking means; and
   means for separating the pellets of the stack exiting from said rotation means to provide a train of mutually spaced pellets downstream thereof, said pellet separating means including second transport means effective to provide separation between said exiting pellets solely by moving them along said path at a velocity greater than said predetermined linear velocity.

6. Apparatus according to claim 5, and further comprising sorting means effective to divert selected pellets out of said path.

7. Apparatus according to claim 6 wherein said sorter means comprises a rotatable turret wheel having bays defined by paddle portions, said turret wheel being capable of rotating clockwise or counterclockwise to divert said selected pellets to one or the other side of said path.

8. Apparatus for transporting a succession of substantially cylindrical pellets along a substantially continuous path to expose them to view by an inspection station; said apparatus comprising:

first transport means for moving said pellets in mutually spaced relationship along said path;

means for stacking a group of said spaced pellets in coaxial end-to-end abutment, said stacking means including a pair of belts movably disposed on opposite sides of said path, said belts presenting parallel gripping surfaces to said pellets positioned in a pair of vertical planes;

means for rotating the assembled stack of pellets around its own axis at a controlled angular velocity in a portion of said path following said stacking means;

pusher means separate from said stacking means and positioned to push said stack continuously at a predetermined linear velocity along said path portion past said inspection station, said pusher means comprising a rotatable thrust pin adapted to contact the trailing pellet of said stack along said stack axis, and means for rotating said thrust pin within said path portion at substantially the same angular velocity as said stack to eliminate relative motion between said thrust pin and said stack; and means disposed downstream of said path portion for separating said stacked pellets to provide mutual spacing therebetween;

whereby said stacked pellets are caused to spiral continuously at a controlled velocity past said inspection station to expose each pellet to view; and whereby said end-to-end abutment of said stacked pellets imparts mechanical stability to minimize pellet vibration during inspection.

9. Apparatus in accordance with claim 8 wherein said pusher means includes means for lifting said thrust pin above said path and moving it to one side thereof after pushing said stack beyond said path portion.

10. Apparatus in accordance with claim 8 and further including sorting means positioned downstream of said pellet separation means, said sorting means being adapted to divert selected pellets to one or the other side of said path.

11. Apparatus for transporting a succession of substantially cylindrical pellets along a substantially continuous path past an inspection station, the opposite ends of said path being defined by a pellet source and a pellet collection station;

first transport means for moving said pellets in mutually spaced relationship from said source along said path;

means for aligning the axis of each of said pellets on said first transport means substantially with the direction of pellet travel;

stacking means succeeding said first transport means and effective to arrange groups of successive pellets into pellet stacks, each of said stacks comprising a predetermined number of said pellets coaxially positioned in end-to-end abutment, said stacking means including a pair of belts movably disposed on opposite sides of said path, said belts presenting parallel gripping surfaces to said pellets positioned in a pair of vertical planes;

means effective to delay the entry of pellets into said stacking means, said delay means being adapted to increase the spacing between the trailing pellet of each of said groups of pellets and the subsequent pellet in said succession;

a pair of mutually spaced rollers extending along a portion of said path parallel thereto and in the field of view of said inspection station, said rollers being adapted to support a stack therebetween;

means for rotating said rollers at a controlled angular velocity adapted to be imparted to said stack supported thereon;

pusher means separate from said stacking means and including a rotatable thrust pin adapted to contact an end face of the trailing pellet of said stack in said increased spacing between said trailing pellet and said subsequent pellet, said pusher means including means for continuously moving said thrust pin in contact with said trailing pellet at a controlled linear velocity along said rollers to impart said linear velocity to said trailing pellet and its corresponding stack, said imparted linear and angular velocities causing said stack to spiral continuously at a controlled velocity along said rollers past said inspection station;

means for separating the pellets of the stack received from said rollers to provide a train of mutually spaced pellets, said pellet separating means including second transport means effective to provide separation between said received pellets by moving said pellets along said path at a velocity greater than said controlled linear velocity; and sorting means effective to remove selected pellets which do not pass inspection from said train of mutually spaced pellets;

whereby the mechanical stability of each pellet in said stack is enhanced during inspection by abutment with its neighboring pellets, and the surfaces of said rollers are maintained in a smooth condition by the uniform honing action provided by the spiraling motion of said pellets.

* * * * *